United States Patent [19]

Driscoll et al.

[11] Patent Number: 5,386,424
[45] Date of Patent: Jan. 31, 1995

[54] APPARATUS AND METHOD FOR TRANSMITTING INFORMATION BETWEEN DUAL REDUNDANT COMPONENTS UTILIZING FOUR SIGNAL PATHS

[75] Inventors: Kevin R. Driscoll; Kenneth P. Hoyme, both of Grove, Minn.

[73] Assignee: Honeywell, Inc., Minneapolis, Minn.

[21] Appl. No.: 41,439

[22] Filed: Mar. 31, 1993

[51] Int. Cl.$^6$ .............................................. G06F 11/08
[52] U.S. Cl. ............................ 371/36; 364/269.1; 326/35
[58] Field of Search .................. 371/36, 30; 307/440, 307/464, 441; 395/575; 364/269.1

[56] References Cited

U.S. PATENT DOCUMENTS

| | | |
|---|---|---|
| 3,696,210 | 10/1972 | Peterson et al. |
| 4,490,785 | 12/1984 | Strecker et al. ............... 364/200 |
| 4,497,059 | 6/1985 | Smith ................................. 371/36 |
| 4,665,522 | 5/1987 | Lala et al. ......................... 371/36 |
| 4,799,140 | 1/1989 | Dietz et al. ....................... 371/36 |
| 5,131,010 | 7/1992 | Derrenge et al. .............. 375/100 |
| 5,233,542 | 8/1993 | Höhner et al. ............... 364/551.01 |
| 5,269,016 | 12/1993 | Butler et al. ..................... 395/575 |

OTHER PUBLICATIONS

Varma et al "Reliability Analysis of Redundant-Path Interconnection Networks" 1889 IEEE pp. 130-137.

Primary Examiner—Robert W. Beausoliel, Jr.
Assistant Examiner—Albert T. Decady
Attorney, Agent, or Firm—Dale E. Jepsen; Ronald Champion; A. Medved

[57] ABSTRACT

An apparatus and method for transmitting information between dual redundant components comprises two information sources each of which is coupled to two transmitters, the outputs of which are coupled to four signal paths for transmission to two independent voters. Each of the voters compares predetermined pairs of the signals on the four signal paths and provides a preferred one of the signals to a corresponding receiver based on the results of the pair comparisons.

14 Claims, 1 Drawing Sheet

Fig.1

APPARATUS AND METHOD FOR TRANSMITTING INFORMATION BETWEEN DUAL REDUNDANT COMPONENTS UTILIZING FOUR SIGNAL PATHS

BACKGROUND OF THE INVENTION

This invention relates in general to the transmission of redundant information over multiple communication paths and more particularly to a method and apparatus for communication of dual redundant information over four communication paths, wherein comparisons are made of certain path pairs in order to provide an indication of the goodness or failure of the signal on a given path.

One of the common current methods of utilizing four signal paths to transmit information between dual redundant components is to simply use the paths as two separate pairs. The common method of detecting a failure using this method is to simply compare the information on one of the paths of a given pair with that on the other path of that same pair. If there is disagreement, that pair is determined to be unusable. Both pairs are similarly checked. Reception succeeds if either pair has information from its two paths that agree. While this method does accomplish accurate failure detection and appropriate identification of the remaining valid information source, there are other pair comparisons which could be made and utilized to identify other valid information source combinations.

SUMMARY OF THE INVENTION

In order to accomplish additional valid information comparisons, the output from a first information source is input to first and second transmitters, the outputs of which are coupled to first and second paths for transmission of the information to first and second voters. The output information from a second information source is coupled to the inputs of third and fourth transmitters, the outputs of which are coupled to third and fourth paths for transmission of the information to first and second voters. The outputs of the first, second, third and fourth transmitters are compared by the first and second voters in a predetermined manner to determine which of the signals on the four paths compare. If one or more do not compare with the remaining signals, the voter selects appropriate information to be transferred to a first receiver and the second voter selects appropriate information to be provided to a second receiver.

The comparisons accomplished in the first and second voters involve comparisons of the information on the first and third paths, the second and fourth paths, the first and fourth paths, and the information on the second and third paths, but not the information on the first and second, or third and fourth paths. Using these various pair combinations, a logic decision is made to determine which of the signals on the paths are acceptable for use by the first and second receivers. In addition, the first and second voters may provide comparison between themselves to confirm that each has made the same selection of the information to be used by the receivers.

In an additional feature, apparatus may be included to detect the loss of transmission of information on each of the four paths. This loss of transmission information is combined with the comparison information to provide a logic decision to determine which of the signals are acceptable for use by the receivers and to indicate the degree of confidence in each signal.

The features and advantages of the present invention will become apparent upon consideration of the following description of the preferred embodiments of the present invention when taken in conjunction with the accompanying drawings.

DESCRIPTION OF THE PREFERRED EMBODIMENT

Figure 1:
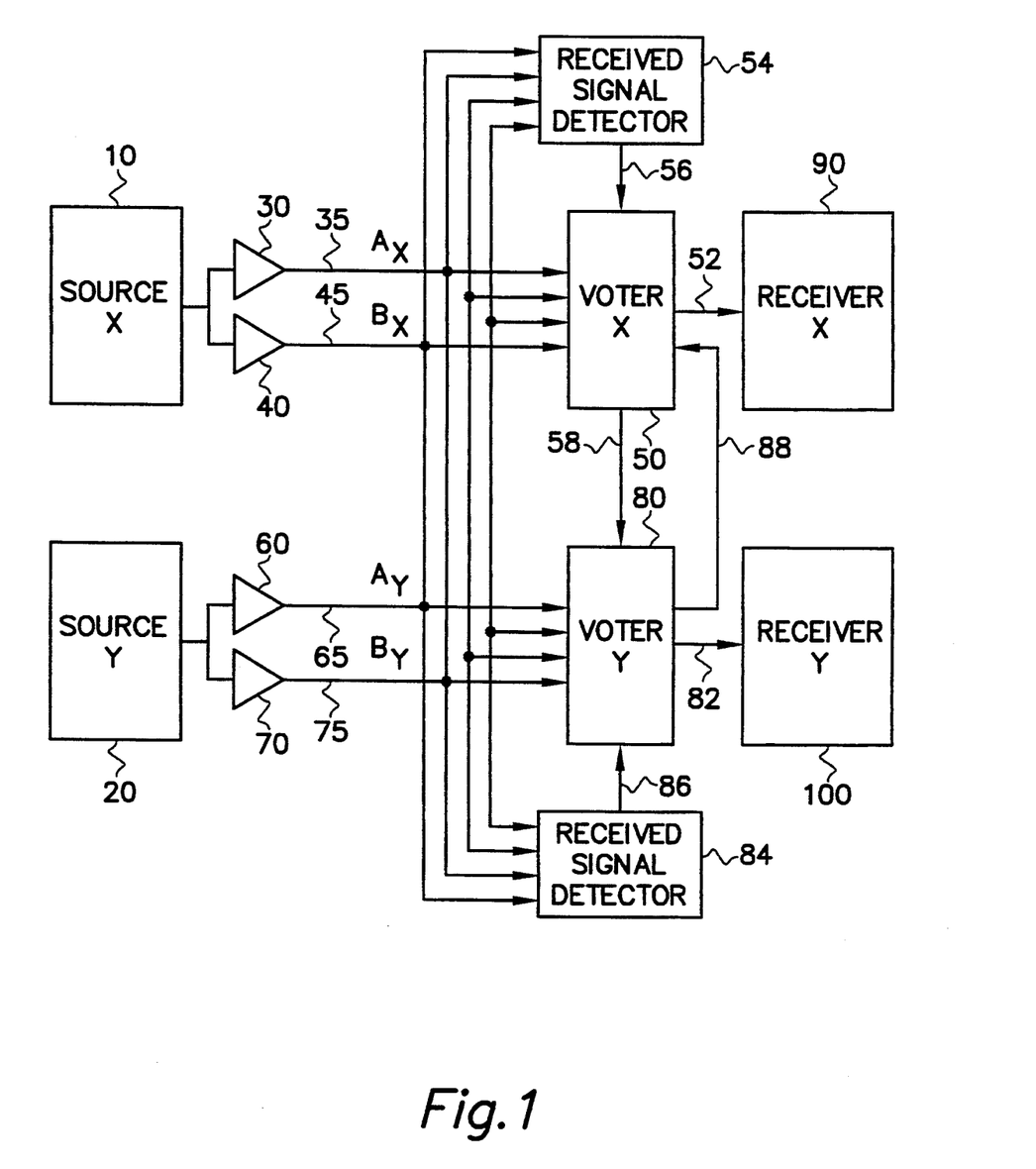
FIG. 1 is a block diagram illustrating the components of the present invention.

The apparatus of the present invention as shown in FIG. 1 is a configuration where data from one dual device, comprising information sources 10 and 20, is used to transmit data over four separate signal lines 35, 45, 65 and 75 via transmitters 30, 40, 60, and 70 respectively, to two independent voters 50 and 80. These voters evaluate the signals Ax, Bx, Ay and By on the four signal lines 35, 45, 65, and 75 and provide a single signal source via outputs 52 and 82 to dual information receivers 90 and 100. Voter blocks 50 and 80 each compare lines 35 to 65, 45 to 75, 35 to 75 and 45 to 65. This produces a four bit syndrome (one bit for each comparison) which is used to select an error free signal for the set (35, 65, 45, 75) or, if no error free signal can be determined, an "uncorrectable error" condition is indicated.

The truth table for the four bit syndrome is shown in Table 1 and indicates the logic decision accomplished for output by each of the independent voters based on the truth of the pair comparisons of the four signals in the four combinations indicated. Since each of the independent voters 50 and 80 performs the identical comparison, the resultant signal applied to receiver 90 and receiver 100 should be identical, in most cases.

The logic decisions made by the separate voters may be compared via lines 58 and 88 to insure that the same signal is in fact selected for the separate independent receivers. Alternative methods of comparing the voter decisions are possible. An exchange of validity signals between voters can be used, with each voter then selecting any signal which falls into the intersection of the sets of validity decisions of both voters. These validity signals can either be the syndrome set or the set identifying valid signals. Alternatively, the voters may simply exchange all of the data signals, as received, with each other and perform any of several well known comparison methods of selecting a valid signal from the resultant eight data signals which should be identical.

This comparison between voters detects faults in the receiver and voter functions of the voters. This comparison also detects those rare faults in the transmitters or the signal lines which cause a signal from a single signal line to appear simultaneously to have different values as perceived by the two voters. This is known in the art as the Byzantine Generals' problem.

The signals on lines 35, 45, 65, and 75 are respectively labeled as signals Ax, Bx, Ay and By in Tables 1, 2, and 3. As indicated in Table 1, the additional comparisons of Ax to By and Bx to Ay provide additional success sets which will allow for operation under conditions which would not be accomplished using the standard prior art comparison involving only Ax to Bx, or Ay to By.

As shown in Table 1, where three or more of the four comparisons made are true, a decision can be made to elect the use of a signal output with relative certainty as to its validity. These decisions are shown in the "Integrity" column of Table 1. In those cases where only one or two of the four comparisons are true, a decision may be made to utilize a signal which had one or two correct comparisons, but with less confidence than when three or more of the four comparisons were true. These decisions are shown in the "Availability" column of Table 1.

In this manner, a user of the received signal may elect to use a given signal in a different manner based on the output of the comparison made, depending on the critical nature of the signal in question. For example, in the case of a flight control signal, a very high confidence level would be desired, whereas less critical signals, such as a navigation related information, may be used with a decreased confidence level and an annunciation indicating a decreased confidence level. Those systems which use binary confidence levels (e.g., good and bad) can convert the decreased confidence level to high or low confidence depending on whether the signal in question is of high or low criticality.

In addition to the comparison function, each of the voters 50 and 80 may receive an additional logic signal from a separate apparatus 54, 84 which detects the loss of transmission of any signal on each of the four signal paths. This separate logic information, shown in the "Quanta Received" column of Tables 2.1–2.6 and 3.1–3.6, may be combined with the previously described comparison information to provide additional sets of logic decisions which indicate both possible failures and the relative confidence of the remaining signals.

Those combinations of comparison information and received signal information resulting in relatively high confidence are shown in Tables 2.1–2.6 in the columns labeled "Integrity". A "Y" in the Ax, Ay, Bx or By "Quanta Valid" columns of Table 2 indicates that particular signal (Ax, Ay, Bx or By) may be used with a relatively high confidence level for the given comparison syndrome and quanta received failures indicated.

Those combinations of comparison information and received signal information resulting in a lower degree of confidence, but still some probability of useful information, are shown in the column of Tables 3.1–3.6 labeled "Availability". A "Y" with an asterisk indicates the particular signals (Ax, Ay, Bx or By) which may by used with a lower degree of confidence, but still a relatively high probability of obtaining useful information. The remaining signal information identified with a "Y" in the "Availability" column of Tables 3.1–3.6 is identical to that from the higher confidence level "Integrity" column of Tables 2.1–2.6 and is repeated in Tables 3.1–3.6 for comparison.

The described logic and comparison functions may be implemented using any of a number of electronic devices capable of performing the described functions, or preferably in an Application Specific Integrated Circuit (ASIC) designed for the specific described functions.

While the invention has been described in conjunction with a particular apparatus and implementation, other equivalent implementations may be made without departing from scope of the invention.

TABLE 1

| Syndrome | | | | VALID SIGNALS | VALID SIGNALS |
| --- | --- | --- | --- | --- | --- |
| Ax=Ay | Bx=By | Ax=By | Bx=Ay | (Safety) | (Availability) |
| T | T | T | T | Any bus | Any bus |
| T | T | T | F | Ax or By | Ax or By |
| T | T | F | T | Bx or Ay | Bx or Ay |
| T | T | F | F | Uncorrectable Error | Any bus |
| T | F | T | T | Ax orAy | Ax or Ay |
| T | F | T | F | Uncorrectable Error | Ax |
| T | F | F | T | Uncorrectable Error | Ay |
| T | F | F | F | Uncorrectable Error | Ax or Ay |
| F | T | T | T | Bx or By | Bx or By |
| F | T | T | F | Uncorrectable Error | By |
| F | T | F | T | Uncorrectable Error | Bx |
| F | T | F | F | Uncorrectalbe Error | Bx or By |
| F | F | T | T | Uncorrectable Error | Any bus |
| F | F | T | F | Uncorrectable Error | Ax or By |
| F | F | F | T | Uncorrectable Error | Bx or Ay |
| F | F | F | F | Uncorrectable Error | Uncorrectable Error |

TABLE 2.1

| Quanta Received | | | | Syndrome | | | | Quanta Valid | | | | Integrity |
| --- | --- | --- | --- | --- | --- | --- | --- | --- | --- | --- | --- | --- |
| Ax | Ay | Bx | By | Ax=Ay | Bx=By | Ax=By | Bx=Ay | Ax | Ay | Bx | By | Reason |
| T | T | T | T | T | T | T | T | Y | Y | Y | Y | All match |
| T | T | T | T | T | T | T | F | Y | | | Y | Checker failure; distrust Ax & Bx |
| T | T | T | T | T | T | F | T | | | Y | Y | Checker failure; distrust Ax & By |
| T | T | T | T | T | T | F | F | | | | | 2-2 tie Ax=Ay; Bx=By |
| T | T | T | T | T | F | T | T | Y | Y | | | Checker failure; distrust Bx & By |
| T | T | T | T | T | F | T | F | Y | Y | | Y | Bx bad |
| T | T | T | T | T | F | F | T | Y | Y | Y | | By bad |
| T | T | T | T | T | F | F | F | | | | | Dual non-identical failure on BxBy |
| T | T | T | T | F | T | T | T | | | Y | Y | Checker failure; distrust Ax & Ay |
| T | T | T | T | F | T | T | F | Y | | Y | Y | Ay bad |
| T | T | T | T | F | T | F | T | | | Y | Y | Ax bad |
| T | T | T | T | F | T | F | F | | | | | Dual non-identical failure on AxAy |

TABLE 2.1-continued

| Ax | Ay | Bx | By | Ax=Ay | Bx=By | Ax=By | Bx=Ay | | | | | Reason |
|---|---|---|---|---|---|---|---|---|---|---|---|---|
| T | T | T | T | F | F | T | T | | | | | 2-2 tie Ax=By; Bx=Ay |
| T | T | T | T | F | F | T | F | | | | | Dual non-identical failure on BxAy |
| T | T | T | T | F | F | F | T | | | | | Dual non-identical failure on AxBy |
| T | T | T | T | F | F | F | F | | | | | Nothing matches - triple failure |

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | T | T | T | T | T | T | T | | Y | Y | Y | All match but Ax missing |
| F | T | T | T | T | T | T | F | | | | | Checker failure; can't isolate |
| F | T | T | T | T | T | F | T | | Y | Y | | Checker failure; distrust Ax & By |
| F | T | T | T | T | T | F | F | | | Y | Y | Bx=By; Ax msng; transient on Ay |
| F | T | T | T | T | F | T | T | | | | | Checker failure; can't isolate |
| F | T | T | T | T | F | T | F | | | | | Ax msng & Bx bad => Uncorrectable |
| F | T | T | T | T | F | F | T | | Y | | Y | By bad & Ax msng |
| F | T | T | T | T | F | F | F | | | | | Dual non-identical failure on BxBy |
| F | T | T | T | F | T | T | T | | | Y | Y | Checker failure; distrust Ax & Ay |
| F | T | T | T | F | T | T | F | | | Y | Y | Ay bad & Ax missing |
| F | T | T | T | F | T | F | T | | Y | Y | Y | Ax bad (normal syndrome for Ax msng) |
| F | T | T | T | F | T | F | F | | | Y | Y | Bx=Ay; Ax msng; transient on By |
| F | T | T | T | F | F | T | T | | | | | Bx=Ay; Ax msng; transient on By |
| F | T | T | T | F | F | T | F | | | | | Dual non-identical failure on BxAy |
| F | T | T | T | F | F | F | T | | Y | | Y | Bx=Ay; Ax msng; transient on By |
| F | T | T | T | F | F | F | F | | | | | Nothing matches - triple failure |

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | F | T | T | T | T | T | T | Y | | Y | Y | All match but Ay missing |
| T | F | T | T | T | T | T | F | Y | | | Y | Checker failure distrust Ay & Bx |
| T | F | T | T | T | T | F | T | | | | | Checker failure; can't isolate |
| T | F | T | T | T | T | F | F | | | Y | Y | Bx=By; Ay msng; transient on Ax |
| T | F | T | T | T | F | T | T | | | | | Checker failure; can't isolate |
| T | F | T | T | T | F | T | F | Y | | | Y | Bx bad & Ay missing |
| T | F | T | T | T | F | F | T | | | | | Ay msng & By bad => Uncorrectable |
| T | F | T | T | T | F | F | F | | | | | Dual non-identical failure on BxBy |
| T | F | T | T | F | T | T | T | | | Y | Y | Checker failure; distrust Ax & Ay |
| T | F | T | T | F | T | T | F | Y | | Y | Y | Ay bad (normal syndrome for Ay msng) |
| T | F | T | T | F | T | F | T | | | Y | Y | Ax bad & Ay missing |
| T | F | T | T | F | T | F | F | | | Y | Y | Bx=By; Ay msng; transient on Ax |
| T | F | T | T | F | F | T | T | Y | | | Y | Ax=By; Ay msng; transient on Bx |
| T | F | T | T | F | F | T | F | Y | | | Y | Ax=By; Ay msng; transient on Bx |
| T | F | T | T | F | F | F | T | | | | | Dual non-identical failure on AxBy |
| T | F | T | T | F | F | F | F | | | | | Nothing matches - triple failure |

TABLE 2.2

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | F | T | T | T | T | T | Y | Y | | Y | All match but Bx missing |
| T | T | F | T | T | T | T | F | Y | | | Y | Checker failure; distrust Ay & Bx |
| T | T | F | T | T | T | F | T | | | | | Checker failure; can't isolate |
| T | T | F | T | T | T | F | F | Y | Y | | | Ax=Ay; Bx msng; transient on By |
| T | T | F | T | T | F | T | T | Y | Y | | | Checker failure; distrust Bx & By |
| T | T | F | T | T | F | T | F | Y | Y | | Y | Bx bad (normal syndrome for Bx msng) |
| T | T | F | T | T | F | F | T | Y | Y | | | By bad & Bx missing |
| T | T | F | T | T | F | F | F | Y | Y | | | Ax=Ay; Bx msng; transient on By |
| T | T | F | T | F | T | T | T | | | | | Checker failure; can't isolate |
| T | T | F | T | F | T | T | F | Y | | | Y | Ay bad & Bx missing |
| T | T | F | T | F | T | F | T | | | | | Bx msng & Ax bad => Uncorrectable |
| T | T | F | T | F | T | F | F | | | | | Dual non-identical failure on AxAy |
| T | T | F | T | F | F | T | T | Y | | | Y | Ax=By; Bx msng; transient on Ay |
| T | T | F | T | F | F | T | F | Y | | | Y | Ax=By; Bx msng; transient on Ay |
| T | T | F | T | F | F | F | T | | | | | Dual non-identical failure on AxBy |
| T | T | F | T | F | F | F | F | | | | | Nothing matches - triple failure |

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | T | F | T | T | T | T | Y | Y | Y | | All match but By missing |
| T | T | T | F | T | T | T | F | | | | | Checker failure; can't isolate |
| T | T | T | F | T | T | F | T | | Y | Y | | Checker failure; distrust Ax & By |
| T | T | T | F | T | T | F | F | Y | Y | | | Ax=Ay; By msng; transient on Bx |
| T | T | T | F | T | F | T | T | | | | | Checker failure; distrust Bx & By |
| T | T | T | F | T | F | T | F | Y | Y | | | Bx bad & By missing |

TABLE 2.2-continued

| Quanta Received | | | | Syndrome | | | | Integrity Quanta Valid | | | | |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | T | F | T | F | F | T | Y | Y | Y | | By bad (normal syndrome for By msng) |
| T | T | T | F | T | F | F | F | Y | Y | | | Ax=Ay; By msng; transient on Bx |
| T | T | T | F | F | T | T | T | | | | | Checker failure; can't isolate |
| T | T | T | F | F | T | T | F | | | | | By msng & Ay bad => Uncorrectable |
| T | T | T | F | F | T | F | T | Y | | Y | | Ax bad & By missing |
| T | T | T | F | F | T | F | F | | | | | Dual non-identical failure on AxAy |
| T | T | T | F | F | F | T | T | Y | Y | | | Bx=Ay; By msng; transient on Ax |
| T | T | T | F | F | F | T | F | | | | | Dual non-identical failure on BxAy |
| T | T | T | F | F | F | F | T | Y | | Y | | Bx=Ay; By msng; transient on Ax |
| T | T | T | F | F | F | F | F | | | | | Nothing matches - triple failure |

| Quanta Received | | | | Syndrome | | | | Integrity Quanta Valid | | | | |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | F | T | T | T | T | T | T | | | Y | Y | Ax & Ay msng: Bx=By |
| F | F | T | T | T | T | T | F | | | Y | Y | Ax & Ay msng: Bx=By |
| F | F | T | T | T | T | F | T | | | Y | Y | Ax & Ay msng: Bx=By |
| F | F | T | T | T | T | F | F | | | Y | Y | Ax & Ay msng: Bx=By |
| F | F | T | T | T | F | T | T | | | | | Ax & Ay msng: Bx≠By => Uncorrectable |
| F | F | T | T | T | F | T | F | | | | | Ax & Ay msng: Bx≠By => Uncorrectable |
| F | F | T | T | T | F | F | T | | | | | Ax & Ay msng: Bx≠By => Uncorrectable |
| F | F | T | T | T | F | F | F | | | | | Ax & Ay msng: Bx≠By => Uncorrectable |
| F | F | T | T | F | T | T | T | | | Y | Y | Ax & Ay msng: Bx=By |
| F | F | T | T | F | T | T | F | | | Y | Y | Ax & Ay msng: Bx=By |
| F | F | T | T | F | T | F | T | | | Y | Y | Ax & Ay msng: Bx=By |
| F | F | T | T | F | T | F | F | | | Y | Y | Ax & Ay msng: Bx=By |
| F | F | T | T | F | F | T | T | | | | | Ax & Ay msng: Bx≠By => Uncorrectable |
| F | F | T | T | F | F | T | F | | | | | Ax & Ay msng: Bx≠By => Uncorrectable |
| F | F | T | T | F | F | F | T | | | | | Ax & Ay msng: Bx≠By => Uncorrectable |
| F | F | T | T | F | F | F | F | | | | | Ax & Ay msng: Bx≠By => Uncorrectable |

TABLE 2.3

| Quanta Received | | | | Syndrome | | | | Integrity Quanta Valid | | | | |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | F | F | T | T | T | T | Y | Y | | | Bx & By msng; Ax=Ay |
| T | T | F | F | T | T | T | F | Y | Y | | | Bx & By msng; Ax=Ay |
| T | T | F | F | T | T | F | T | Y | Y | | | Bx & By msng; Ax=Ay |
| T | T | F | F | T | T | F | F | Y | Y | | | Bx & By msng; Ax=Ay |
| T | T | F | F | T | F | T | T | Y | Y | | | Bx & By msng; Ax=Ay |
| T | T | F | F | T | F | T | F | Y | Y | | | Bx & By msng; Ax=Ay |
| T | T | F | F | T | F | F | T | Y | Y | | | Bx & By msng; Ax=Ay |
| T | T | F | F | T | F | F | F | Y | Y | | | Bx & By msng; Ax=Ay |
| T | T | F | F | F | T | T | T | | | | | Bx & By msng; Ax≠Ay => Uncorrectable |
| T | T | F | F | F | T | T | F | | | | | Bx & By msng; Ax≠Ay => Uncorrectable |
| T | T | F | F | F | T | F | T | | | | | Bx & By msng; Ax≠Ay => Uncorrectable |
| T | T | F | F | F | T | F | F | | | | | Bx & By msng; Ax≠Ay => Uncorrectable |
| T | T | F | F | F | F | T | T | | | | | Bx & By msng; Ax≠Ay => Uncorrectable |
| T | T | F | F | F | F | T | F | | | | | Bx & By msng; Ax≠Ay => Uncorrectable |
| T | T | F | F | F | F | F | T | | | | | Bx & By msng; Ax≠Ay => Uncorrectable |
| T | T | F | F | F | F | F | F | | | | | Bx & By msng; Ax≠Ay => Uncorrectable |

| Quanta Received | | | | Syndrome | | | | Integrity Quanta Valid | | | | |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | T | T | F | T | T | T | T | | Y | Y | | Ax & By msng; Bx=Ay |
| F | T | T | F | T | T | T | F | | | | | Ax & By msng; Bx≠Ay => Uncorrectable |
| F | T | T | F | T | T | F | T | | Y | Y | | Ax & By msng; Bx=Ay |
| F | T | T | F | T | T | F | F | | | | | Ax & By msng; Bx≠Ay => Uncorrectable |
| F | T | T | F | T | F | T | T | | Y | Y | | Ax & By msng; Bx=Ay |
| F | T | T | F | T | F | T | F | | | | | Ax & By msng; Bx≠Ay => Uncorrectable |
| F | T | T | F | T | F | F | T | | Y | Y | | Ax & By msng; Bx=Ay |
| F | T | T | F | T | F | F | F | | | | | Ax & By msng; Bx≠Ay => Uncorrectable |
| F | T | T | F | F | T | T | T | | Y | Y | | Ax & By msng; Bx=Ay |
| F | T | T | F | F | T | T | F | | | | | Ax & By msng; Bx≠Ay => Uncorrectable |
| F | T | T | F | F | T | F | T | | Y | Y | | Ax & By msng; Bx=Ay |
| F | T | T | F | F | T | F | F | | | | | Ax & By msng; Bx≠Ay => Uncorrectable |
| F | T | T | F | F | F | T | T | | Y | Y | | Ax & By msng; Bx=Ay |
| F | T | T | F | F | F | T | F | | | | | Ax & By msng; Bx≠Ay => Uncorrectable |
| F | T | T | F | F | F | F | T | | Y | Y | | Ax & By msng; Bx=Ay |
| F | T | T | F | F | F | F | F | | | | | Ax & By msng; Bx≠Ay => Uncorrectable |

| Quanta Received | | | | Syndrome | | | | Integrity Quanta Valid | | | | |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |

TABLE 2.3-continued

| Ax | Ay | Bx | By | Ax=Ay | Bx=By | Ax=By | Bx=Ay | | | Reason |
|---|---|---|---|---|---|---|---|---|---|---|
| T | F | F | T | T | T | T | T | Y | Y | Bx & Ay msng: Ax=By |
| T | F | F | T | T | T | T | F | Y | Y | Bx & Ay msng: Ax=By |
| T | F | F | T | T | T | F | T | | | Bx & Ay msng: Ax≠By => Uncorrectable |
| T | F | F | T | T | T | F | F | | | Bx & Ay msng: Ax≠By ≠> Uncorrectable |
| T | F | F | T | T | F | T | T | Y | Y | Bx & Ay msng: Ax=By |
| T | F | F | T | T | F | T | F | Y | Y | Bx & Ay msng: Ax=By |
| T | F | F | T | T | F | F | T | | | Bx & Ay msng: Ax≠By => Uncorrectable |
| T | F | F | T | T | F | F | F | | | Bx & Ay msng: Ax≠By => Uncorrectable |
| T | F | F | T | F | T | T | T | Y | Y | Bx & Ay msng: Ax=By |
| T | F | F | T | F | T | T | F | Y | Y | Bx & Ay msng: Ax=By |
| T | F | F | T | F | T | F | T | | | Bx & Ay msng: Ax≠By => Uncorrectable |
| T | F | F | T | F | T | F | F | | | Bx & Ay msng: Ax≠By => Uncorrectable |
| T | F | F | T | F | F | T | T | Y | Y | Bx & Ay msng: Ax=By |
| T | F | F | T | F | F | T | F | Y | Y | Bx & Ay msng: Ax=By |
| T | F | F | T | F | F | F | T | | | Bx & Ay msng: Ax≠By => Uncorrectable |
| T | F | F | T | F | F | F | F | | | Bx & Ay msng: Ax≠By => Uncorrectable |

TABLE 2.4

| Quanta Received | | | | Syndrome | | | | Integrity | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| F | T | F | T | T | T | T | T | X | X | X | X | Both Ax and Bx msng; No quanta cmpr |
| F | T | F | T | T | T | T | F | X | X | X | X | Both Ax and Bx msng; No quanta cmpr |
| F | T | F | T | T | T | F | T | X | X | X | X | Both Ax and Bx msng; No quanta cmpr |
| F | T | F | T | T | T | F | F | X | X | X | X | Both Ax and Bx msng; No quanta cmpr |
| F | T | F | T | T | F | T | T | X | X | X | X | Both Ax and Bx msng; No quanta cmpr |
| F | T | F | T | T | F | T | F | X | X | X | X | Both Ax and Bx msng; No quanta cmpr |
| F | T | F | T | T | F | F | T | X | X | X | X | Both Ax and Bx msng; No quanta cmpr |
| F | T | F | T | T | F | F | F | X | X | X | X | Both Ax and Bx msng; No quanta cmpr |
| F | T | F | T | F | T | T | T | | | X | X | Both Ax and Bx msng; No quanta cmpr |
| F | T | F | T | F | T | T | F | X | X | X | X | Both Ax and Bx msng; No quanta cmpr |
| F | T | F | T | F | T | F | T | X | X | X | X | Both Ax and Bx msng; No quanta cmpr |
| F | T | F | T | F | T | F | F | X | X | X | X | Both Ax and Bx msng; No quanta cmpr |
| F | T | F | T | F | F | T | T | X | X | X | X | Both Ax and Bx msng; No quanta cmpr |
| F | T | F | T | F | F | T | F | X | X | X | X | Both Ax and Bx msng; No quanta cmpr |
| F | T | F | T | F | F | F | T | X | X | X | X | Both Ax and Bx msng; No quanta cmpr |
| F | T | F | T | F | F | F | F | X | X | X | X | Both Ax and Bx msng; No quanta cmpr |

| Quanta Received | | | | Syndrome | | | | Integrity | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | F | T | F | T | T | T | T | X | X | X | X | Both Ay and By msng; No quanta cmpr |
| T | F | T | F | T | T | T | F | X | X | X | X | Both Ay and By msng; No quanta cmpr |
| T | F | T | F | T | T | F | T | X | X | X | X | Both Ay and By msng; No quanta cmpr |
| T | F | T | F | T | T | F | F | X | X | X | X | Both Ay and By msng; No quanta cmpr |
| T | F | T | F | T | F | T | T | X | X | X | X | Both Ay and By msng; No quanta cmpr |
| T | F | T | F | T | F | T | F | X | X | X | X | Both Ay and By msng; No quanta cmpr |
| T | F | T | F | T | F | F | T | X | X | X | X | Both Ay and By msng; No quanta cmpr |
| T | F | T | F | T | F | F | F | X | X | X | X | Both Ay and By msng; No quanta cmpr |
| T | F | T | F | F | T | T | T | X | X | X | X | Both Ay and By msng; No quanta cmpr |
| T | F | T | F | F | T | T | F | X | X | X | X | Both Ay and By msng; No quanta cmpr |
| T | F | T | F | F | T | F | T | X | X | X | X | Both Ay and By msng; No quanta cmpr |
| T | F | T | F | F | T | F | F | X | X | X | X | Both Ay and By msng; No quanta cmpr |
| T | F | T | F | F | F | T | T | X | X | X | X | Both Ay and By msng; No quanta cmpr |
| T | F | T | F | F | F | T | F | X | X | X | X | Both Ay and By msng; No quanta cmpr |
| T | F | T | F | F | F | F | T | X | X | X | X | Both Ay and By msng; No quanta cmpr |
| T | F | T | F | F | F | F | F | X | X | X | X | Both Ay and By msng; No quanta cmpr |

| Quanta Received | | | | Syndrome | | | | Integrity | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | F | F | F | T | T | T | T | X | X | X | X | Three busses msng; No quanta compr |
| T | F | F | F | T | T | T | F | X | X | X | X | Three busses msng; No quanta compr |
| T | F | F | F | T | T | F | T | X | X | X | X | Three busses msng; No quanta compr |
| T | F | F | F | T | T | F | F | X | X | X | X | Three busses msng; No quanta compr |
| T | F | F | F | T | F | T | T | X | X | X | X | Three busses msng; No quanta compr |
| T | F | F | F | T | F | T | F | X | X | X | X | Three busses msng; No quanta compr |
| T | F | F | F | T | F | F | T | X | X | X | X | Three busses msng; No quanta compr |
| T | F | F | F | T | F | F | F | X | X | X | X | Three busses msng; No quanta compr |
| T | F | F | F | F | T | T | T | X | X | X | X | Three busses msng; No quanta compr |
| T | F | F | F | F | T | T | F | X | X | X | X | Three busses msng; No quanta compr |
| T | F | F | F | F | T | F | T | X | X | X | X | Three busses msng; No quanta compr |
| T | F | F | F | F | T | F | F | X | X | X | X | Three busses msng; No quanta compr |
| T | F | F | F | F | F | T | T | X | X | X | X | Three busses msng; No quanta compr |
| T | F | F | F | F | F | T | F | X | X | X | X | Three busses msng; No quanta compr |

TABLE 2.4-continued

| Ax | Ay | Bx | By | Ax=Ay | Bx=By | Ax=By | Bx=Ay | Ax | Ay | Bx | By | Reason |
|---|---|---|---|---|---|---|---|---|---|---|---|---|
| T | F | F | F | F | F | F | T | X | X | X | X | Three busses msng; No quanta compr |
| T | F | F | F | F | F | F | F | X | X | X | X | Three busses msng; No quanta compr |

TABLE 2.5

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | T | F | F | T | T | T | T | X | X | X | X | Three busses msng; No quanta compr |
| F | T | F | F | T | T | T | F | X | X | X | X | Three busses msng; No quanta compr |
| F | T | F | F | T | T | F | T | X | X | X | X | Three busses msng; No quanta compr |
| F | T | F | F | T | T | F | F | X | X | X | X | Three busses msng; No quanta compr |
| F | T | F | F | T | F | T | T | X | X | X | X | Three busses msng; No quanta compr |
| F | T | F | F | T | F | T | F | X | X | X | X | Three busses msng; No quanta compr |
| F | T | F | F | T | F | F | T | X | X | X | X | Three busses msng; No quanta compr |
| F | T | F | F | T | F | F | F | X | X | X | X | Three busses msng; No quanta compr |
| F | T | F | F | F | T | T | T | X | X | X | X | Three busses msng; No quanta compr |
| F | T | F | F | F | T | T | F | X | X | X | X | Three busses msng; No quanta compr |
| F | T | F | F | F | T | F | T | X | X | X | X | Three busses msng; No quanta compr |
| F | T | F | F | F | T | F | F | X | X | X | X | Three busses msng; No quanta compr |
| F | T | F | F | F | F | T | T | X | X | X | X | Three busses msng; No quanta compr |
| F | T | F | F | F | F | T | F | X | X | X | X | Three busses msng; No quanta compr |
| F | T | F | F | F | F | F | T | X | X | X | X | Three busses msng; No quanta compr |
| F | T | F | F | F | F | F | F | X | X | X | X | Three busses msng; No quanta compr |

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | F | T | F | T | T | T | F | X | X | X | X | Three busses msng; No quanta compr |
| F | F | T | F | T | T | T | F | X | X | X | X | Three busses msng; No quanta compr |
| F | F | T | F | T | T | F | T | X | X | X | X | Three busses msng; No quanta compr |
| F | F | T | F | T | T | F | F | X | X | X | X | Three busses msng; No quanta compr |
| F | F | T | F | T | F | T | T | X | X | X | X | Three busses msng; No quanta compr |
| F | F | T | F | T | F | T | F | X | X | X | X | Three busses msng; No quanta compr |
| F | F | T | F | T | F | F | T | X | X | X | X | Three busses msng; No quanta compr |
| F | F | T | F | T | F | F | F | X | X | X | X | Three busses msng; No quanta compr |
| F | F | T | F | F | T | T | T | X | X | X | X | Three busses msng; No quanta compr |
| F | F | T | F | F | T | T | F | X | X | X | X | Three busses msng; No quanta compr |
| F | F | T | F | F | T | F | T | X | X | X | X | Three busses msng; No quanta compr |
| F | F | T | F | F | T | F | F | X | X | X | X | Three busses msng; No quanta compr |
| F | F | T | F | F | F | T | T | X | X | X | X | Three busses msng; No quanta compr |
| F | F | T | F | F | F | T | F | X | X | X | X | Three busses msng; No quanta compr |
| F | F | T | F | F | F | F | T | X | X | X | X | Three busses msng; No quanta compr |
| F | F | T | F | F | F | F | F | X | X | X | X | Three busses msng; No quanta compr |

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | F | F | T | T | T | T | F | X | X | X | X | Three busses msng; No quanta compr |
| F | F | F | T | T | T | T | F | X | X | X | X | Three busses msng; No quanta compr |
| F | F | F | T | T | T | F | T | X | X | X | X | Three busses msng; No quanta compr |
| F | F | F | T | T | T | F | F | X | X | X | X | Three busses msng; No quanta compr |
| F | F | F | T | T | F | T | T | X | X | X | X | Three busses msng; No quanta compr |
| F | F | F | T | T | F | T | F | X | X | X | X | Three busses msng; No quanta compr |
| F | F | F | T | T | F | F | T | X | X | X | X | Three busses msng; No quanta compr |
| F | F | F | T | T | F | F | F | X | X | X | X | Three busses msng; No quanta compr |
| F | F | F | T | F | T | T | T | X | X | X | X | Three busses msng; No quanta compr |
| F | F | F | T | F | T | T | F | X | X | X | X | Three busses msng; No quanta compr |
| F | F | F | T | F | T | F | T | X | X | X | X | Three busses msng; No quanta compr |
| F | F | F | T | F | T | F | F | X | X | X | X | Three busses msng; No quanta compr |
| F | F | F | T | F | F | T | T | X | X | X | X | Three busses msng; No quanta compr |
| F | F | F | T | F | F | T | F | X | X | X | X | Three busses msng; No quanta compr |
| F | F | F | T | F | F | F | T | X | X | X | X | Three busses msng; No quanta compr |
| F | F | F | T | F | F | F | F | X | X | X | X | Three busses msng; No quanta compr |

TABLE 2.6

| Quanta Received | | | | Syndrome | | | | Quanta Valid | | | | Integrity |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | F | F | F | T | T | T | T | X | X | X | X | All busses msng; No quanta compr |
| F | F | F | F | T | T | T | F | X | X | X | X | All busses msng; No quanta compr |
| F | F | F | F | T | T | F | T | X | X | X | X | All busses msng; No quanta compr |
| F | F | F | F | T | T | F | F | X | X | X | X | All busses msng; No quanta compr |
| F | F | F | F | T | F | T | T | X | X | X | X | All busses msng; No quanta compr |

TABLE 2.6-continued

| | | | | | | | | | | | | |
|---|---|---|---|---|---|---|---|---|---|---|---|---|
| F | F | F | F | T | F | T | F | X | X | X | X | All busses msng; No quanta compr |
| F | F | F | F | T | F | F | T | X | X | X | X | All busses msng; No quanta compr |
| F | F | F | F | T | F | F | F | X | X | X | X | All busses msng; No quanta compr |
| F | F | F | F | F | T | T | T | X | X | X | X | All busses msng; No quanta compr |
| F | F | F | F | F | T | T | F | X | X | X | X | All busses msng; No quanta compr |
| F | F | F | F | F | T | F | T | X | X | X | X | All busses msng; No quanta compr |
| F | F | F | F | F | T | F | F | X | X | X | X | All busses msng; No quanta compr |
| F | F | F | F | F | F | T | T | X | X | X | X | All busses msng; No quanta compr |
| F | F | F | F | F | F | T | F | X | X | X | X | All busses msng; No quanta compr |
| F | F | F | F | F | F | F | T | X | X | X | X | All busses msng; No quanta compr |
| F | F | F | F | F | F | F | F | X | X | X | X | All busses msng; No quanta compr |

TABLE 3.1

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | T | T | T | T | T | T | T | Y | Y | Y | Y | All match |
| T | T | T | T | T | T | T | F | Y | Y* | Y* | Y | Checker failure; data is fine |
| T | T | T | T | T | T | F | T | Y* | Y | Y | Y* | Checker failure; data is fine |
| T | T | T | T | T | T | F | F | Y* | Y* | Y* | Y* | 2-2 tie Ax=Ay; Bx=By; pick one |
| T | T | T | T | T | F | T | T | Y | Y | Y* | Y* | Checker failure; data is fine |
| T | T | T | T | T | F | T | F | Y | Y | | Y | Bx bad |
| T | T | T | T | T | F | F | T | Y | Y | Y | | By bad |
| T | T | T | T | T | F | F | F | Y* | Y* | | | Dual non-identical failure on BxBy |
| T | T | T | T | F | T | T | T | Y* | Y* | Y | Y | Checker failure; data is fine |
| T | T | T | T | F | T | T | F | Y | | Y | Y | Ay bad |
| T | T | T | T | F | T | F | T | | Y | Y | Y | Ax bad |
| T | T | T | T | F | T | F | F | | | Y* | Y* | Dual non-identical failure on AxAy |
| T | T | T | T | F | F | T | T | Y* | Y* | Y* | Y* | 2-2 tie Ax=By; Bx=Ay; pick one |
| T | T | T | T | F | F | T | F | Y* | | | Y* | Dual non-identical failure on BxAy |
| T | T | T | T | F | F | F | T | | Y* | Y* | | Dual non-identical failure on AxBy |
| T | T | T | T | F | F | F | F | | | | | Nothing matches - triple failure |

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| F | T | T | T | T | T | T | T | | Y | Y | Y | All match but Ax missing |
| F | T | T | T | T | T | T | F | | | Y* | Y* | Checker failure; distrust Ay |
| F | T | T | T | T | T | F | T | | Y | Y | Y* | Checker failure; data is fine |
| F | T | T | T | T | T | F | F | | | Y | Y | Bx=By; Ax msng; transient on Ay |
| F | T | T | T | T | F | T | T | | Y* | Y* | | Checker failure; distrust By |
| F | T | T | T | T | F | T | F | | | | | Ax msng & Bx bad => Uncorrectable |
| F | T | T | T | T | F | F | T | | Y | Y | | By bad & Ax msng |
| F | T | T | T | T | F | F | F | | | | | Dual non-identical failure on BxBy |
| F | T | T | T | F | T | T | T | | Y* | Y | Y | Checker failure; data is fine |
| F | T | T | T | F | T | T | F | | | Y | Y | Ay bad & Ax missing |
| F | T | T | T | F | T | F | T | | Y | Y | Y | Ax bad (normal syndrome for Ax msng) |
| F | T | T | T | F | T | F | F | | | Y | Y | Bx=Ay; Ax msng; transient on Ay |
| F | T | T | T | F | F | T | T | | Y | Y | | Bx=Ay; Ax msng; transient on By |
| F | T | T | T | F | F | T | F | | | | | Dual non-identical failure on BxAy |
| F | T | T | T | F | F | F | T | | Y | Y | | Bx=Ay; Ax msng; transient on By |
| F | T | T | T | F | F | F | F | | | | | Nothing matches - triple failure |

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | F | T | T | T | T | T | T | Y | | Y | Y | All match but Ay missing |
| T | F | T | T | T | T | T | F | Y | | Y* | Y | Checker failure; distrust Ax |
| T | F | T | T | T | T | F | T | | | Y* | Y* | Checker failure; distrust Ax |
| T | F | T | T | T | T | F | F | | | Y | Y | Bx=By; Ay msng; transient on Ax |
| T | F | T | T | T | F | T | T | Y* | | | Y* | Checker failure; distrust Bx |
| T | F | T | T | T | F | T | F | Y | | | Y | Bx bad & Ay missing |
| T | F | T | T | T | F | F | T | | | | | Ay msng & By bad => Uncorrectable |
| T | F | T | T | T | F | F | F | | | | | Dual non-identical failure on BxBy |
| T | F | T | T | F | T | T | T | Y* | | Y | Y | Checker failure; data is fine |
| T | F | T | T | F | T | T | F | Y | | Y | Y | Ay bad (normal syndrome for Ay msng) |
| T | F | T | T | F | T | F | T | | | Y | Y | Ax bad & Ay missing |
| T | F | T | T | F | T | F | F | | | Y | Y | Bx=By; Ay msng; transient on Ax |
| T | F | T | T | F | F | T | T | Y | | | Y | Ax=By; Ay msng; transient on Bx |
| T | F | T | T | F | F | T | F | Y | | | Y | Ax=By; Ay msng; transient on Bx |
| T | F | T | T | F | F | F | T | | | | | Dual non-identical failure on AxBy |
| T | F | T | T | F | F | F | F | | | | | Nothing matches - triple failure |

*Entry which is different between Integrity and Availability

TABLE 3.2

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | F | T | T | T | T | T | Y | Y |  | Y | All match but Bx missing |
| T | T | F | T | T | T | T | F | Y | Y* |  | Y | Checker failure; data is fine |
| T | T | F | T | T | T | F | T | Y* | Y* |  |   | Checker failure; distrust By |
| T | T | F | T | T | T | F | F | Y | Y |  |   | Ax=Ay; Bx msng; transient on By |
| T | T | F | T | T | F | T | T | Y | Y |  | Y* | Checker failure; data is fine |
| T | T | F | T | T | F | T | F | Y | Y |  | Y | Bx bad (normal syndrome for Bx msng) |
| T | T | F | T | T | F | F | T | Y | Y |  |   | By bad & Bx missing |
| T | T | F | T | T | F | F | F | Y | Y |  |   | Ax=Ay; Bx msng; transient on By |
| T | T | F | T | F | T | T | T | Y* |   |  | Y* | Checker failure; distrust Ay |
| T | T | F | T | F | T | T | F | Y |   |  | Y | Ay bad & Bx missing |
| T | T | F | T | F | T | F | T |   |   |  |   | Bx msng & Ax bad => Uncorrectable |
| T | T | F | T | F | T | F | F |   |   |  |   | Dual non-identical failure on AxAy |
| T | T | F | T | F | F | T | T | Y |   |  | Y | Ax=By; Bx msng; transient on Ay |
| T | T | F | T | F | F | T | F | Y |   |  | Y | Ax=By; Bx msng; transient on Ay |
| T | T | F | T | F | F | F | T |   |   |  |   | Dual non-identical failure on AxBy |
| T | T | F | T | F | F | F | F |   |   |  |   | Nothing matches - triple failure |

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | T | F | T | T | T | F | Y | Y | Y |   | All match but By missing |
| T | T | T | F | T | T | T | F | Y* | Y* |   |   | Checker failure; distrust Bx |
| T | T | T | F | T | T | F | T | Y* | Y | Y |   | Checker failure; data is fine |
| T | T | T | F | T | T | F | F | Y | Y |   |   | Ax=Ay; By msng; transient on Bx |
| T | T | T | F | T | F | T | T | Y | Y | Y* |   | Checker failure; data is fine |
| T | T | T | F | T | F | T | F | Y | Y |   |   | Bx bad & By missing |
| T | T | T | F | T | F | F | T | Y | Y | Y |   | By bad (normal syndrome for By msng) |
| T | T | T | F | T | F | F | F | Y | Y |   |   | Ax=Ay; By msng; transient on Bx |
| T | T | T | F | F | T | T | T | Y* | Y* |   |   | Checker failure; distrust Ax |
| T | T | T | F | F | T | T | F |   |   |   |   | By msng & Ay bad => Uncorrectable |
| T | T | T | F | F | T | F | T | Y | Y |   |   | Ax bad & By missing |
| T | T | T | F | F | T | F | F |   |   |   |   | Dual non-identical failure on AxAy |
| T | T | T | F | F | F | T | T | Y | Y |   |   | Bx=Ay; By msng; transient on Ax |
| T | T | T | F | F | F | T | F |   |   |   |   | Dual non-identical failure on BxAy |
| T | T | T | F | F | F | F | T | Y | Y |   |   | Bx=Ay; By msng; transient on Ax |
| T | T | T | F | F | F | F | F |   |   |   |   | Nothing matches - triple failure |

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | F | T | T | T | T | T | T |   |   | Y | Y | Ax & Ay msng: Bx=By |
| F | F | T | T | T | T | T | F |   |   | Y | Y | Ax & Ay msng: Bx=By |
| F | F | T | T | T | T | F | T |   |   | Y | Y | Ax & Ay msng: Bx=By |
| F | F | T | T | T | T | F | F |   |   | Y | Y | Ax & Ay msng: Bx=By |
| F | F | T | T | T | F | T | T |   |   |   |   | Ax & Ay msng: Bx≠By => Uncorrectable |
| F | F | T | T | T | F | T | F |   |   |   |   | Ax & Ay msng: Bx≠By => Uncorrectable |
| F | F | T | T | T | F | F | T |   |   |   |   | Ax & Ay msng: Bx≠By => Uncorrectable |
| F | F | T | T | T | F | F | F |   |   |   |   | Ax & Ay msng: Bx=By => Uncorrectable |
| F | F | T | T | F | T | T | T |   |   | Y | Y | Ax & Ay msng: Bx=By |
| F | F | T | T | F | T | T | F |   |   | Y | Y | Ax & Ay msng: Bx=By |
| F | F | T | T | F | T | F | T |   |   | Y | Y | Ax & Ay msng: Bx=By |
| F | F | T | T | F | T | F | F |   |   | Y | Y | Ax & Ay msng: Bx≠By |
| F | F | T | T | F | F | T | T |   |   |   |   | Ax & Ay msng: Bx≠By => Uncorrectable |
| F | F | T | T | F | F | T | F |   |   |   |   | Ax & Ay msng: Bx≠By => Uncorrectable |
| F | F | T | T | F | F | F | T |   |   |   |   | Ax & Ay msng: Bx≠By => Uncorrectable |
| F | F | T | T | F | F | F | F |   |   |   |   | Ax & Ay msng: Bx≠By => Uncorrectable |

*Entry which is different between Integrity and Availability

TABLE 3.3

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | T | F | F | T | T | T | T | Y | Y |   |   | Bx & By msng; Ax=Ay |
| T | T | F | F | T | T | T | F | Y | Y |   |   | Bx & By msng; Ax=Ay |
| T | T | F | F | T | T | F | T | Y | Y |   |   | Bx & By msng; Ax=Ay |
| T | T | F | F | T | T | F | F | Y | Y |   |   | Bx & By msng; Ax=Ay |
| T | T | F | F | T | F | T | T | Y | Y |   |   | Bx & By msng; Ax=Ay |
| T | T | F | F | T | F | T | F | Y | Y |   |   | Bx & By msng; Ax=Ay |
| T | T | F | F | T | F | F | T | Y | Y |   |   | Bx & By msng; Ax=Ay |
| T | T | F | F | T | F | F | F | Y | Y |   |   | Bx & By msng; Ax=Ay |
| T | T | F | F | F | T | T | T |   |   |   |   | Bx & By msng; Ax≠Ay => Uncorrectable |
| T | T | F | F | F | T | T | F |   |   |   |   | Bx & By msng; Ax≠Ay => Uncorrectable |

TABLE 3.3-continued

| Quanta Received | | | | Syndrome | | | | Availability | | | | |
|---|---|---|---|---|---|---|---|---|---|---|---|---|
| Ax | Ay | Bx | By | Ax=Ay | Bx=By | Ax=By | Bx=Ay | | | | | Reason |
| T | T | F | F | F | T | F | T | | | | | Bx & By msng; Ax≠Ay => Uncorrectable |
| T | T | F | F | F | T | F | F | | | | | Bx & By msng; Ax≠Ay => Uncorrectable |
| T | T | F | F | F | F | T | T | | | | | Bx & By msng; Ax≠Ay => Uncorrectable |
| T | T | F | F | F | F | T | F | | | | | Bx & By msng; Ax≠Ay => Uncorrectable |
| T | T | F | F | F | F | F | T | | | | | Bx & By msng; Ax≠Ay => Uncorrectable |
| T | T | F | F | F | F | F | F | | | | | Bx & By msng; Ax≠Ay => Uncorrectable |

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | T | T | F | T | T | T | T | | Y | Y | | Ax & By msng; Bx=Ay |
| F | T | T | F | T | T | T | F | | | | | Ax & By msng; Bx≠Ay => Uncorrectable |
| F | T | T | F | T | T | F | T | | Y | Y | | Ax & By msng; Bx=Ay |
| F | T | T | F | T | T | F | F | | | | | Ax & By msng; Bx≠Ay => Uncorrectable |
| F | T | T | F | T | F | T | T | | Y | Y | | Ax & By msng; Bx=Ay |
| F | T | T | F | T | F | T | F | | | | | Ax & By msng; Bx≠Ay => Uncorrectable |
| F | T | T | F | T | F | F | T | | Y | Y | | Ax & By msng; Bx=Ay |
| F | T | T | F | T | F | F | F | | | | | Ax & By msng; Bx≠Ay => Uncorrectable |
| F | T | T | F | F | T | T | T | | Y | Y | | Ax & By msng; Bx=Ay |
| F | T | T | F | F | T | T | F | | | | | Ax & By msng; Bx≠Ay => Uncorrectable |
| F | T | T | F | F | T | F | T | | Y | Y | | Ax & By msng; Bx=Ay |
| F | T | T | F | F | T | F | F | | | | | Ax & By msng; Bx≠Ay => Uncorrectable |
| F | T | T | F | F | F | T | T | | Y | Y | | Ax & By msng; Bx=Ay |
| F | T | T | F | F | F | T | F | | | | | Ax & By msng; Bx≠Ay => Uncorrectable |
| F | T | T | F | F | F | F | T | | Y | Y | | Ax & By msng; Bx=Ay |
| F | T | T | F | F | F | F | F | | | | | Ax & By msng; Bx≠Ay => Uncorrectable |

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | F | F | T | T | T | T | T | Y | | | Y | Bx & Ay msng: Ax=By |
| T | F | F | T | T | T | T | F | Y | | | Y | Bx & Ay msng: Ax=By |
| T | F | F | T | T | T | F | T | | | | | Bx & Ay msng: Ax≠By => Uncorrectable |
| T | F | F | T | T | T | F | F | | | | | Bx & Ay msng: Ax≠By ≠> Uncorrectable |
| T | F | F | T | T | F | T | T | Y | | | Y | Bx & Ay msng: Ax=By |
| T | F | F | T | T | F | T | F | Y | | | Y | Bx & Ay msng: Ax=By |
| T | F | F | T | T | F | F | T | | | | | Bx & Ay msng: Ax≠By => Uncorrectable |
| T | F | F | T | T | F | F | F | | | | | Bx & Ay msng: Ax≠By => Uncorrectable |
| T | F | F | T | F | T | T | T | Y | | | Y | Bx & Ay msng: Ax=By |
| T | F | F | T | F | T | T | F | Y | | | Y | Bx & Ay msng: Ax=By |
| T | F | F | T | F | T | F | T | | | | | Bx & Ay msng: Ax≠By => Uncorrectable |
| T | F | F | T | F | T | F | F | | | | | Bx & Ay msng: Ax≠By => Uncorrectable |
| T | F | F | T | F | F | T | T | Y | | | Y | Bx & Ay msng: Ax=By |
| T | F | F | T | F | F | T | F | Y | | | Y | Bx & Ay msng: Ax=By |
| T | F | F | T | F | F | F | T | | | | | Bx & Ay msng: Ax≠By => Uncorrectable |
| T | F | F | T | F | F | F | F | | | | | Bx & Ay msng: Ax≠By => Uncorrectable |

*Entry which is different between Integrity and Availability

TABLE 3.4

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| F | T | F | T | T | T | T | T | X | X | X | X | Both Ax and Bx msng; No quanta cmpr |
| F | T | F | T | T | T | T | F | X | X | X | X | Both Ax and Bx msng; No quanta cmpr |
| F | T | F | T | T | T | F | T | X | X | X | X | Both Ax and Bx msng; No quanta cmpr |
| F | T | F | T | T | T | F | F | X | X | X | X | Both Ax and Bx msng; No quanta cmpr |
| F | T | F | T | T | F | T | T | X | X | X | X | Both Ax and Bx msng; No quanta cmpr |
| F | T | F | T | T | F | T | F | X | X | X | X | Both Ax and Bx msng; No quanta cmpr |
| F | T | F | T | T | F | F | T | X | X | X | X | Both Ax and Bx msng; No quanta cmpr |
| F | T | F | T | T | F | F | F | X | X | X | X | Both Ax and Bx msng; No quanta cmpr |
| F | T | F | T | F | T | T | T | | | X | X | Both Ax and Bx msng; No quanta cmpr |
| F | T | F | T | F | T | T | F | X | X | X | X | Both Ax and Bx msng; No quanta cmpr |
| F | T | F | T | F | T | F | T | X | X | X | X | Both Ax and Bx msng; No quanta cmpr |
| F | T | F | T | F | T | F | F | X | X | X | X | Both Ax and Bx msng; No quanta cmpr |
| F | T | F | T | F | F | T | T | X | X | X | X | Both Ax and Bx msng; No quanta cmpr |
| F | T | F | T | F | F | T | F | X | X | X | X | Both Ax and Bx msng; No quanta cmpr |
| F | T | F | T | F | F | F | T | X | X | X | X | Both Ax and Bx msng; No quanta cmpr |
| F | T | F | T | F | F | F | F | X | X | X | X | Both Ax and Bx msng; No quanta cmpr |

| Quanta Received | | | | Syndrome | | | | Quanta Valid | | | | Availability |
|---|---|---|---|---|---|---|---|---|---|---|---|---|
| Ax | Ay | Bx | By | Ax=Ay | Bx=By | Ax=By | Bx=Ay | Ax | Ay | Bx | By | Reason |
| T | F | T | F | T | T | T | T | X | X | X | X | Both Ay and By msng; No quanta cmpr |
| T | F | T | F | T | T | T | F | X | X | X | X | Both Ay and By msng; No quanta cmpr |
| T | F | T | F | T | T | F | T | X | X | X | X | Both Ay and By msng; No quanta cmpr |

TABLE 3.4-continued

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | F | T | F | T | T | F | F | X | X | X | X | Both Ay and By msng; No quanta cmpr |
| T | F | T | F | T | F | T | T | X | X | X | X | Both Ay and By msng; No quanta cmpr |
| T | F | T | F | T | F | T | F | X | X | X | X | Both Ay and By msng; No quanta cmpr |
| T | F | T | F | T | F | F | T | X | X | X | X | Both Ay and By msng; No quanta cmpr |
| T | F | T | F | T | F | F | F | X | X | X | X | Both Ay and By msng; No quanta cmpr |
| T | F | T | F | F | T | T | T | X | X | X | X | Both Ay and By msng; No quanta cmpr |
| T | F | T | F | F | T | T | F | X | X | X | X | Both Ay and By msng; No quanta cmpr |
| T | F | T | F | F | T | F | T | X | X | X | X | Both Ay and By msng; No quanta cmpr |
| T | F | T | F | F | T | F | F | X | X | X | X | Both Ay and By msng; No quanta cmpr |
| T | F | T | F | F | F | T | T | X | X | X | X | Both Ay and By msng; No quanta cmpr |
| T | F | T | F | F | F | T | F | X | X | X | X | Both Ay and By msng; No quanta cmpr |
| T | F | T | F | F | F | F | T | X | X | X | X | Both Ay and By msng; No quanta cmpr |
| T | F | T | F | F | F | F | F | X | X | X | X | Both Ay and By msng; No quanta cmpr |

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| T | F | F | F | T | T | T | T | X | X | X | X | Three busses msng; No quanta compr |
| T | F | F | F | T | T | T | F | X | X | X | X | Three busses msng; No quanta compr |
| T | F | F | F | T | T | F | T | X | X | X | X | Three busses msng; No quanta compr |
| T | F | F | F | T | T | F | F | X | X | X | X | Three busses msng; No quanta compr |
| T | F | F | F | T | F | T | T | X | X | X | X | Three busses msng; No quanta compr |
| T | F | F | F | T | F | T | F | X | X | X | X | Three busses msng; No quanta compr |
| T | F | F | F | T | F | F | T | X | X | X | X | Three busses msng; No quanta compr |
| T | F | F | F | T | F | F | F | X | X | X | X | Three busses msng; No quanta compr |
| T | F | F | F | F | T | T | T | X | X | X | X | Three busses msng; No quanta compr |
| T | F | F | F | F | T | T | F | X | X | X | X | Three busses msng; No quanta compr |
| T | F | F | F | F | T | F | T | X | X | X | X | Three busses msng; No quanta compr |
| T | F | F | F | F | T | F | F | X | X | X | X | Three busses msng; No quanta compr |
| T | F | F | F | F | F | T | T | X | X | X | X | Three busses msng; No quanta compr |
| T | F | F | F | F | F | T | F | X | X | X | X | Three busses msng; No quanta compr |
| T | F | F | F | F | F | F | T | X | X | X | X | Three busses msng; No quanta compr |
| T | F | F | F | F | F | F | F | X | X | X | X | Three busses msng; No quanta compr |

*Entry which is different between Integrity and Availability

TABLE 3.5

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| F | T | F | F | T | T | T | T | X | X | X | X | Three busses msng; No quanta compr |
| F | T | F | F | T | T | T | F | X | X | X | X | Three busses msng; No quanta compr |
| F | T | F | F | T | T | F | T | X | X | X | X | Three busses msng; No quanta compr |
| F | T | F | F | T | T | F | F | X | X | X | X | Three busses msng; No quanta compr |
| F | T | F | F | T | F | T | T | X | X | X | X | Three busses msng; No quanta compr |
| F | T | F | F | T | F | T | F | X | X | X | X | Three busses msng; No quanta compr |
| F | T | F | F | T | F | F | T | X | X | X | X | Three busses msng; No quanta compr |
| F | T | F | F | T | F | F | F | X | X | X | X | Three busses msng; No quanta compr |
| F | T | F | F | F | T | T | T | X | X | X | X | Three busses msng; No quanta compr |
| F | T | F | F | F | T | T | F | X | X | X | X | Three busses msng; No quanta compr |
| F | T | F | F | F | T | F | T | X | X | X | X | Three busses msng; No quanta compr |
| F | T | F | F | F | T | F | F | X | X | X | X | Three busses msng; No quanta compr |
| F | T | F | F | F | F | T | T | X | X | X | X | Three busses msng; No quanta compr |
| F | T | F | F | F | F | T | F | X | X | X | X | Three busses msng; No quanta compr |
| F | T | F | F | F | F | F | T | X | X | X | X | Three busses msng; No quanta compr |
| F | T | F | F | F | F | F | F | X | X | X | X | Three busses msng; No quanta compr |

| Quanta Received | | | | Syndrome | | | | Availability | | | | |
|---|---|---|---|---|---|---|---|---|---|---|---|---|
| | | | | | | | | Quanta Valid | | | | |
| Ax | Ay | Bx | By | Ax=Ay | Bx=By | Ax=By | Bx=Ay | Ax | Ay | Bx | By | Reason |
| F | F | T | F | T | T | T | F | X | X | X | X | Three busses msng; No quanta compr |
| F | F | T | F | T | T | T | F | X | X | X | X | Three busses msng; No quanta compr |
| F | F | T | F | T | T | F | T | X | X | X | X | Three busses msng; No quanta compr |
| F | F | T | F | T | T | F | F | X | X | X | X | Three busses msng; No quanta compr |
| F | F | T | F | T | F | T | T | X | X | X | X | Three busses msng; No quanta compr |
| F | F | T | F | T | F | T | F | X | X | X | X | Three busses msng; No quanta compr |
| F | F | T | F | T | F | F | T | X | X | X | X | Three busses msng; No quanta compr |
| F | F | T | F | T | F | F | F | X | X | X | X | Three busses msng; No quanta compr |
| F | F | T | F | F | T | T | T | X | X | X | X | Three busses msng; No quanta compr |
| F | F | T | F | F | T | T | F | X | X | X | X | Three busses msng; No quanta compr |
| F | F | T | F | F | T | F | T | X | X | X | X | Three busses msng; No quanta compr |
| F | F | T | F | F | T | F | F | X | X | X | X | Three busses msng; No quanta compr |
| F | F | T | F | F | F | T | T | X | X | X | X | Three busses msng; No quanta compr |
| F | F | T | F | F | F | T | F | X | X | X | X | Three busses msng; No quanta compr |
| F | F | T | F | F | F | F | T | X | X | X | X | Three busses msng; No quanta compr |
| F | F | T | F | F | F | F | F | X | X | X | X | Three busses msng; No quanta compr |

TABLE 3.5-continued

| Quanta Received | | | | Syndrome | | | | Availability | | | | |
| --- | --- | --- | --- | --- | --- | --- | --- | --- | --- | --- | --- | --- |
| | | | | | | | | Quanta Valid | | | | |
| Ax | Ay | Bx | By | Ax=Ay | Bx=By | Ax=By | Bx=Ay | Ax | Ay | Bx | By | Reason |
| F | F | F | T | T | T | T | F | X | X | X | X | Three busses msng; No quanta compr |
| F | F | F | T | T | T | T | F | X | X | X | X | Three busses msng; No quanta compr |
| F | F | F | T | T | T | F | T | X | X | X | X | Three busses msng; No quanta compr |
| F | F | F | T | T | T | F | F | X | X | X | X | Three busses msng; No quanta compr |
| F | F | F | T | T | F | T | T | X | X | X | X | Three busses msng; No quanta compr |
| F | F | F | T | T | F | T | F | X | X | X | X | Three busses msng; No quanta compr |
| F | F | F | T | T | F | F | T | X | X | X | X | Three busses msng; No quanta compr |
| F | F | F | T | T | F | F | F | X | X | X | X | Three busses msng; No quanta compr |
| F | F | F | T | F | T | T | T | X | X | X | X | Three busses msng; No quanta compr |
| F | F | F | T | F | T | T | F | X | X | X | X | Three busses msng; No quanta compr |
| F | F | F | T | F | T | F | T | X | X | X | X | Three busses msng; No quanta compr |
| F | F | F | T | F | T | F | F | X | X | X | X | Three busses msng; No quanta compr |
| F | F | F | T | F | F | T | T | X | X | X | X | Three busses msng; No quanta compr |
| F | F | F | T | F | F | T | F | X | X | X | X | Three busses msng; No quanta compr |
| F | F | F | T | F | F | F | T | X | X | X | X | Three busses msng; No quanta compr |
| F | F | F | T | F | F | F | F | X | X | X | X | Three busses msng; No quanta compr |

TABLE 3.6

| Quanta Received | | | | Syndrome | | | | Availability | | | | |
| --- | --- | --- | --- | --- | --- | --- | --- | --- | --- | --- | --- | --- |
| | | | | | | | | Quanta Valid | | | | |
| Ax | Ay | Bx | By | Ax=Ay | Bx=By | Ax=By | Bx=Ay | Ax | Ay | Bx | By | Reason |
| F | F | F | F | T | T | T | T | X | X | X | X | All busses msng; No quanta compr |
| F | F | F | F | T | T | T | F | X | X | X | X | All busses msng; No quanta compr |
| F | F | F | F | T | T | F | T | X | X | X | X | All busses msng; No quanta compr |
| F | F | F | F | T | T | F | F | X | X | X | X | All busses msng; No quanta compr |
| F | F | F | F | T | F | T | T | X | X | X | X | All busses msng; No quanta compr |
| F | F | F | F | T | F | T | F | X | X | X | X | All busses msng; No quanta compr |
| F | F | F | F | T | F | F | T | X | X | X | X | All busses msng; No quanta compr |
| F | F | F | F | T | F | F | F | X | X | X | X | All busses msng; No quanta compr |
| F | F | F | F | F | T | T | T | X | X | X | X | All busses msng; No quanta compr |
| F | F | F | F | F | T | T | F | X | X | X | X | All busses msng; No quanta compr |
| F | F | F | F | F | T | F | T | X | X | X | X | All busses msng; No quanta compr |
| F | F | F | F | F | T | F | F | X | X | X | X | All busses msng; No quanta compr |
| F | F | F | F | F | F | T | T | X | X | X | X | All busses msng; No quanta compr |
| F | F | F | F | F | F | T | F | X | X | X | X | All busses msng; No quanta compr |
| F | F | F | F | F | F | F | T | X | X | X | X | All busses msng; No quanta compr |
| F | F | F | F | F | F | F | F | X | X | X | X | All busses msng; No quanta compr |

What is claimed is:

1. An apparatus for transmitting information from two identical information sources to first and second information receivers over four signal paths comprising:

a first information source for generating a first information signal;

a second information source for generating a second information signal identical to said first information signal;

first and second transmitters, coupled to said first information source and to respective first and second signal paths for receiving said first information signal and generating therefrom respective first and second transmitted signals for transmission over said first and second signal paths, respectively;

third and fourth transmitters, coupled to said second information source, and to respective third and fourth signal paths, for receiving said second information signal and generating therefrom respective third and fourth transmitted signals for transmission over said third and fourth signal paths, respectively;

first voter means, coupled to said first, second, third and fourth signal paths and to said first information receiver, for comparing predetermined pairs of said first, second, third and fourth transmitted signals to obtain a first comparison result, for determining a first preferred one of said transmitted signals based on said first comparison result, and for sending said first preferred one of said transmitted signals to said first information receiver; and second voter means, coupled to said first, second, third and fourth signal paths and to said second information receiver, for comparing said predetermined pairs of said first, second, third and fourth transmitted signals to obtain a second comparison result, for determining a second preferred one of said transmitted signals based on said second comparison result, and for sending said second preferred one of said transmitted signals to said second information receiver.

2. The apparatus of claim 1 wherein said predetermined pairs of transmitted signals comprise said first and third, second and fourth, first and fourth, and second and third transmitted signals, but not said first and second, or third and fourth transmitted signals.

3. The apparatus of claim 2 wherein said first and second preferred ones of said transmitted signals are sent to said first and second information receivers, respectively, only if three or more of said predetermined pairs of signals are identical.

4. The apparatus of claim 2 wherein said first and second preferred ones of said transmitted signals are sent to said first and second information receivers respectively, if at least one of said predetermined pairs of signals are identical.

5. The apparatus of claim 2 further comprising comparison means for inhibiting the sending of said first and second preferred ones of said transmitted signals to said first and second information receivers when said first preferred one of said transmitted signals is not the same as said second preferred one of said transmitted signals.

6. The apparatus of claim 2 further comprising first and second received signal detection means coupled to said first, second, third and fourth signal paths and respectively coupled to said first and second voter means, for receiving said first, second, third and fourth transmitted signals and providing first, second, third and fourth quanta received logic signals to said first and second voter means respectively, to indicate whether or not each of said first, second, third and fourth transmitted signals was received by said received signal detection means, and wherein said determinations of said preferred ones of said transmitted signals are also based on said first, second, third and fourth quanta received logic signals.

7. The apparatus of claim 2 wherein said first and second voter means respectively provide to said first and second information receivers an additional signal to indicate the confidence level of said preferred ones of said transmitted signals.

8. The apparatus of claim 7 wherein said additional signal indicates a high level of confidence when three or more of said predetermined pairs match, a lower degree of confidence when only one or two of said predetermined pairs match and an uncorrectable error signal when none of said predetermined pairs match.

9. An apparatus in accordance with claim 1 further comprising:
third and fourth information receivers;
third voter means, coupled to said first, second, third and fourth signal paths and to said third information receiver, for comparing predetermined pairs of said first, second third and fourth transmitted signals to obtain a third comparison result, for determining a preferred one of said transmitted signals based on said third comparison result, and sending said third preferred one of said transmitted signals to said third information receiver; and
fourth voter means, coupled to said first, second, third and fourth signal paths and to said fourth information receiver, for comparing said predetermined pairs of said first, second, third and fourth transmitted signals to obtain a fourth comparison result, for determining a fourth preferred one of said transmitted signals based on said fourth comparison result, and sending said fourth preferred one of said transmitted signals to said fourth information receiver.

10. The apparatus of claim 2 wherein said first and second preferred ones of said transmitted signals are selectably sent to said first and second information receivers, respectively,
in a first selectable instance when three or more of said predetermined pairs of signals are identical, or
in a second selectable instance when at least one of said predetermined pairs of signals are identical.

11. The apparatus of claim 2 wherein said first comparison result is transmitted to said second voter means, said second comparison result is transmitted to said first voter means, and each of said first and second voter means selects a preferred one of said transmitted signals based on both of said first and second comparison results.

12. The apparatus of claim 2 wherein a first confidence level signal, indicative of how many pair comparisons were valid in said first comparison result, is sent to said first information receiver; and a second confidence level signal, indicative of how many pair comparisons were valid in said second comparison result, is sent to said second information receiver.

13. The apparatus of claim 2 wherein said first voter means also sends to said first information receiver a first fault signal, based on said first comparison result, indicative of which, if any, of said first, second, third and forth transmitted signals is in error; and
wherein said second voter means also sends to said second information receiver a second fault signal, based on said second comparison result, indicative of which, if any, of said first, second, third and fourth transmitted signals is in error.

14. The apparatus of claim 6 wherein said first voter means also sends to said first information receiver a first fault signal, based on said first comparison result and said quanta received logic signals, indicative of which, if any, of said first second, third and fourth transmitted signals is in error; and
wherein said second voter means also sends to said second information receiver a second fault signal, based on said second comparison result and said quanta received logic signals, indicative of which, if any, of said first, second, third and fourth transmitted signals is in error.

* * * * *